(12) United States Patent
Liu

(10) Patent No.: US 7,716,404 B2
(45) Date of Patent: May 11, 2010

(54) PSEUDO-FULL DUPLEX COMMUNICATION USING A HALF DUPLEX COMMUNICATION PROTOCOL

(75) Inventor: Yi-Li Liu, Delta (CA)

(73) Assignee: ATEN International Co., Ltd., Shijr (TW)

( * ) Notice: Subject to any disclaimer, the term of this patent is extended or adjusted under 35 U.S.C. 154(b) by 88 days.

(21) Appl. No.: 12/036,225

(22) Filed: Feb. 23, 2008

(65) Prior Publication Data

US 2009/0216925 A1 Aug. 27, 2009

(51) Int. Cl.
- G06F 13/42 (2006.01)
- G06F 13/28 (2006.01)
- G06F 3/00 (2006.01)
- G06F 15/173 (2006.01)
- G08C 19/22 (2006.01)

(52) U.S. Cl. .......... 710/106; 709/224; 710/24; 710/26; 340/870.07; 370/85.1

(58) Field of Classification Search .......... 710/106, 710/26, 29; 340/870.07; 370/85.1; 709/224
See application file for complete search history.

(56) References Cited

U.S. PATENT DOCUMENTS

| | | | | |
|---|---|---|---|---|
| 5,231,629 A | * | 7/1993 | Kotzin et al. | 370/279 |
| 5,243,544 A | * | 9/1993 | Schoess | 702/141 |
| 5,452,302 A | * | 9/1995 | Lewis | 370/449 |
| 5,557,751 A | * | 9/1996 | Banman et al. | 398/136 |
| 5,659,575 A | * | 8/1997 | Vielhaber et al. | 375/213 |
| 5,721,737 A | * | 2/1998 | Radjabi et al. | 370/449 |
| 6,401,159 B1 | | 6/2002 | Wang | |
| 6,567,869 B2 | * | 5/2003 | Shirley | 710/62 |
| 7,065,622 B2 | * | 6/2006 | Donnelly et al. | 711/167 |
| 7,415,552 B2 | * | 8/2008 | Chen | 710/73 |
| 7,444,401 B1 | * | 10/2008 | Keyghobad et al. | 709/224 |
| 2002/0073183 A1 | * | 6/2002 | Yoon et al. | 709/220 |
| 2003/0174070 A1 | * | 9/2003 | Garrod et al. | 340/870.07 |
| 2004/0052219 A1 | | 3/2004 | Lin et al. | |
| 2005/0231462 A1 | * | 10/2005 | Chen | 345/156 |
| 2006/0045127 A1 | * | 3/2006 | Hall | 370/466 |
| 2008/0208366 A1 | * | 8/2008 | Dalby et al. | 700/3 |

* cited by examiner

*Primary Examiner*—Mark Rinehart
*Assistant Examiner*—Christopher A Daley
(74) *Attorney, Agent, or Firm*—Chen Yoshimura LLP

(57) ABSTRACT

In a communication system having a master-slave arrangement communicating with each other using the RS485 protocol, an FPGA with a buffer memory is provided in the master and slave, respectively, to handle the actual communication. The CPUs of the master and slave transfer data to and from the respective buffer memory. The master's FPGA initiates and maintains communication with the slave's FPGA. The masters FPGA and the slave's FPGA communicate with each other using the RS485 protocol by transmitting requests, acknowledgements and data. From the standpoint of the CPUs of the master and slave, the communication appears to be full duplex, although the actual communication between the FPGAs is half duplex. One particular application of the communication method is a KVM switch system where the KVM switch acts as the master and the computers connected to the KVM switch act as slaves.

16 Claims, 7 Drawing Sheets

PSEUDO-FULL DUPLEX COMMUNICATION USING A HALF DUPLEX COMMUNICATION PROTOCOL

BACKGROUND OF THE INVENTION

1. Field of the Invention

This invention relates to communication methods, and in particular, it relates to a communication method that achieves pseudo-full duplex communication using a half duplex communication protocol.

2. Description of the Related Art

Conventional RS485 (also known as EIA-485) communication uses a master-slave arrangement, where the master initiates communication activities with a request and the slave answers. The system is a half-duplex system, as each device (master or slave) cannot transmit and receive at the same time. If the slave has data to be transferred to the master, the slave must wait until it receives the request from the master. If the time interval between the master's requests is relatively long, the data from the slave cannot be timely transferred to the master, causing delay in data transfer. Shortening the time interval between the master's requests, on the other hand, will increase the burden on the CPU of the master as well as the burden on the CPU of the slave.

SUMMARY OF THE INVENTION

The present invention is directed to a communication method and apparatus that substantially obviates one or more of the problems due to limitations and disadvantages of the related art.

An object of the present invention is to provide a pseudo-full duplex communication system and method using RS485 as the underlying communication protocol.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a system which includes: a master, the master including a first processor, a first logic circuit with a first buffer memory connected to the first processor, and a first transceiver device connected to the first logic circuit, wherein the first transceiver device is adapted for connecting to a communication link, and wherein the first logic circuit is operable to transmit initial requests over the communication link, to receive acknowledgements over the communication link, and to transmit acknowledgements or acknowledgements with data from its buffer memory over the communication link in response to the received acknowledgements. The system may further include a slave, the slave including a second processor, a second logic circuit with a second buffer memory connected to the second processor, and a second transceiver device connected to the second logic circuit, wherein the second transceiver device is connected to the communication link, wherein the second logic circuit is operable to receive initial requests and acknowledgements from the first logic circuit over the communication link, and to transmits acknowledgements or acknowledgements with data from its buffer memory to the first logic circuit over the communication link in response to the initial requests or the acknowledgements received from the first logic circuit.

In another aspect, the present invention provides a method of communication performed by a master, the master including a processor, a logic circuit with a buffer memory connected to the processor, and a transceiver device connected to the logic circuit, the transceiver device being adapted for connecting to a communication link, the method including: the processor transferring data to and from the buffer memory; the logic circuit transmitting initial requests or initial requests with data from its buffer memory over the communication link; the logic circuit receiving acknowledgements over the communication link; the logic circuit transmitting acknowledgements or acknowledgements with data from its buffer memory over the communication link in response to the received acknowledgements.

In yet another aspect, the present invention provides a method of communication between a master and a slave, the master including a first processor, a first logic circuit with a first buffer memory connected to the first processor, and a first transceiver device connected to the first logic circuit, the slave including a second processor, a second logic circuit with a second buffer memory connected to the second processor, and a second transceiver device connected to the second logic circuit, the method including: the first processor transferring data to and from the first buffer memory; the second processor transferring data to and from the second buffer memory; the first logic circuit transmitting initial requests or initial requests with data from its buffer memory to the second logic circuit; the second logic circuit transmitting acknowledgements or acknowledgements with data from its buffer memory to the first logic circuit in response to the initial requests; the first logic circuit transmitting acknowledgements or acknowledgements with data from its buffer memory to the second logic circuit in response to the acknowledgements received from the second logic circuit; and the second logic circuit transmitting acknowledgements or acknowledgements with data from its buffer memory to the first logic circuit in response to the acknowledgements received from the first logic circuit.

In another aspect, the present invention provides a system which includes: a master, the master including a first processor, a first logic circuit connected to the first processor, a first buffer memory accessible by the first processor and the first logic circuit, and a first transceiver device connected to the first logic circuit, wherein the first transceiver device is adapted for connecting to a communication link, wherein the first processor is operable to store into the first buffer memory first data to be transferred over the communication link, and to retrieve from the first buffer memory second data received over the communication link, and wherein the first logic circuit is operable, without intervention of the first processor, to transmit the first data in the first buffer memory over the communication link using the first transceiver device, and to receive the second data over the communication link using the first transceiver device and store it in the first buffer memory.

In another aspect, the present invention provides a method of communication performed by a master, the master including a processor, a logic circuit connected to the processor, a buffer memory accessible by the processor and the logic circuit, and a transceiver device connected to the logic circuit, the transceiver device being adapted for connecting to a communication link, the method including: (a) the processor storing into the buffer memory first data to be transferred over the communication link; (b) the logic circuit, without intervention of the processor, transmitting the first data in the buffer memory over the communication link using the transceiver device and receiving second data over the communication link using the transceiver device and storing it in the buffer memory; and (c) the processor retrieving the second data from the buffer memory.

In another aspect, the present invention provides a method of communication between a master and a slave, the master including a first processor, a first logic circuit connected to the first processor, and a first buffer memory accessible by the first processor and the first logic circuit, the slave including a second processor, a second logic circuit connected to the second processor, and a second buffer memory accessible by the second processor and the second logic circuit, the master and the slave being connected by a communication link, the method including: (a) the first processor storing first data in the first buffer memory; (b) the second processor storing second data in the second buffer memory; (c) the first and second logic circuits, without intervention of the first and second processors, transferring the first data from the first buffer memory of the master to the second buffer memory of the slave over the communication link and transferring the second data form the second buffer memory of the slave to first buffer memory of the master over the communication link; (d) the first processor retrieving the second data from the first buffer memory; and (e) the second processor retrieving the first data from the second buffer memory.

It is to be understood that both the foregoing general description and the following detailed description are exemplary and explanatory and are intended to provide further explanation of the invention as claimed.

DETAILED DESCRIPTION OF THE PREFERRED EMBODIMENTS

Detailed illustrative embodiments of the present invention are disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 5:
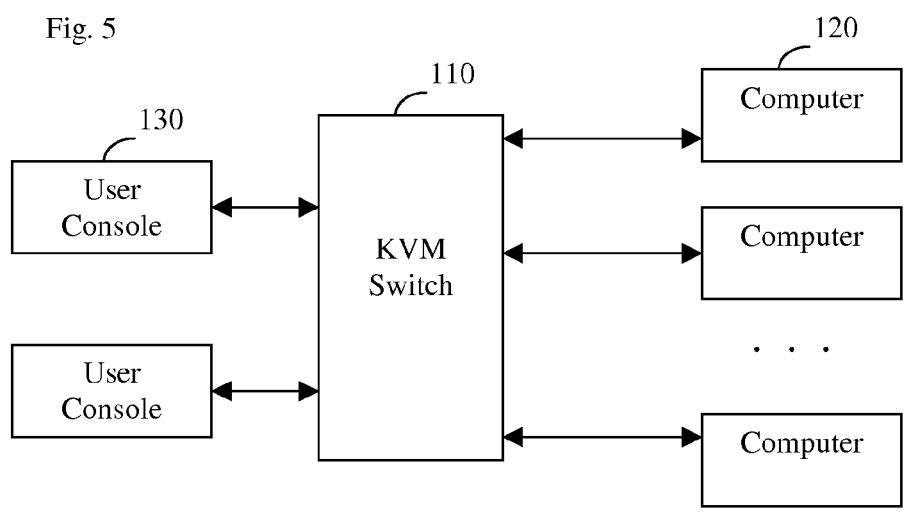
FIG. 5 illustrates a KVM switch system in which a communication method according to embodiments of the present invention may be applied.

Embodiments of the present invention provide a method and apparatus that achieve pseudo-full duplex communication using a half duplex communication protocol such as the RS485 protocol. One particular application of the communication method is a KVM (keyboard video mouse) switch system, shown in FIG. 5. A KVM switch 110 is a switching device that connects one or more user consoles 130 (each including a monitor, keyboard, and/or mouse) to multiple computers 120 so that each user console can selectively control any one of the computers 120. In the system shown in FIG. 5, the computers 120 are connected to the KVM switch 110 by Cat5 (Category 5) cables, which allow the computers 120 to be located at a large distance (up to hundreds of feet) away from the KVM switch 110. The KVM switch 110 and the computers 120 use the RS485 protocol to communicate with each other. The KVM switch 110 and each computer 120 use one or more UART (universal asynchronous receiver/transmitter) to transmit and receive signals over the Cat5 cables. In such a system, the KVM switch 110 is the master and each computer 120 is a slave under the RS485 communication scheme.

Figure 1:
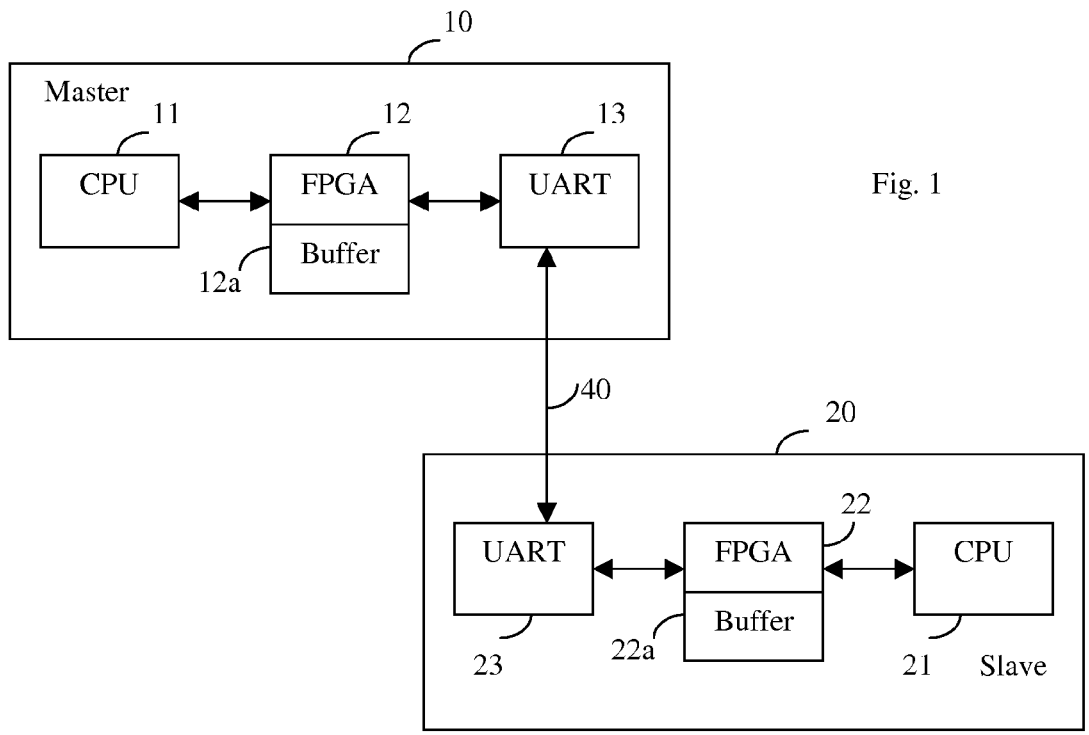
FIG. 1 illustrates a system including a master and a slave communicating with each other according to an embodiment of the present invention.

FIG. 1 illustrates a system according to an embodiment of the present invention, where a master 10 and a slave 20 communicate with each other using the RS485 communication protocol. The master 10 and slave 20 may be the KVM switch 110 and a computer 120, respectively, in the KVM switch system of FIG. 5. More generally, the master 10 and slave 20 may be any devices that act as a mater and a slave, respectively, that communicate with each other using the RS485 protocol. As shown in FIG. 1, the master 10 includes a CPU 11, a logic circuit 12 connected to the CPU 11, and a transceiver device such as a UART 13 connected to the logic circuit 12. In this example the transceiver device 13 is an RS485 transceiver. As used in this disclosure, the term transceiver broadly refers to any device that has both receiving and transmitting functions. Similarly, the slave 20 includes a CPU 21, a logic circuit 22 connected to the CPU 21, and a transceiver device such as a UART 23 connected to the logic circuit 22. The UARTs 13 and 23 of the master 10 and slave 20 transmit and receive signals over a communication link such as a Cat5 cable 40 connecting the two devices 10 and 20. More generally, the transceiver devices 13 and 23 may be any suitable transceiver devices, and the communication link 40 may be any suitable link including wired and wireless links. The CPUs 11 and 21 carry out the normal functions of the master and the slave devices, respectively. The logic circuits 12 and 22 handle the communication between the master and slave in a manner described in detail later. The logic circuits 12 and 22 may be implemented as FPGAs (field-programmable gate arrays), ASICs (application-specific integrated circuits), processors, or other suitable hardware structures. FPGAs are used in the descriptions below as an example, but are not limited thereto.

The master 10 and slave 20 shown in FIG. 1 are different from conventional masters and slaves in that, in a conventional master, the CPU is directly connected to a UART and performs the function of initiating RS485 communication by transmitting requests to the slave via the UART. Similarly, in a conventional slave device, the CPU is directly connected to a UART, and the CPU handles the requests received from the master and transmits answers to the master via the UART.

In the system according to embodiments of the present invention, shown in FIG. 1, the CPU 11 of the master 10 stores any data to be transferred to the slave 20 into a buffer memory 12a of the FPGA 12 using, for example, direct memory access. Similarly, the CPU 21 of the slave 20 stores any data to be transferred to the master 10 into a buffer memory 22a of the FPGA 22. The actual communication between the master 10 and slave 20 is handled by the respective FPGAs 12 and 22.

The data received from the other side is stored in the buffer memories 12a and 22a of the FPGA 12 and 22, respectively, and the CPUs 11 and 21 retrieve the received data from the buffer memories 12a and 22s, respectively, for their usage.

Figure 2:
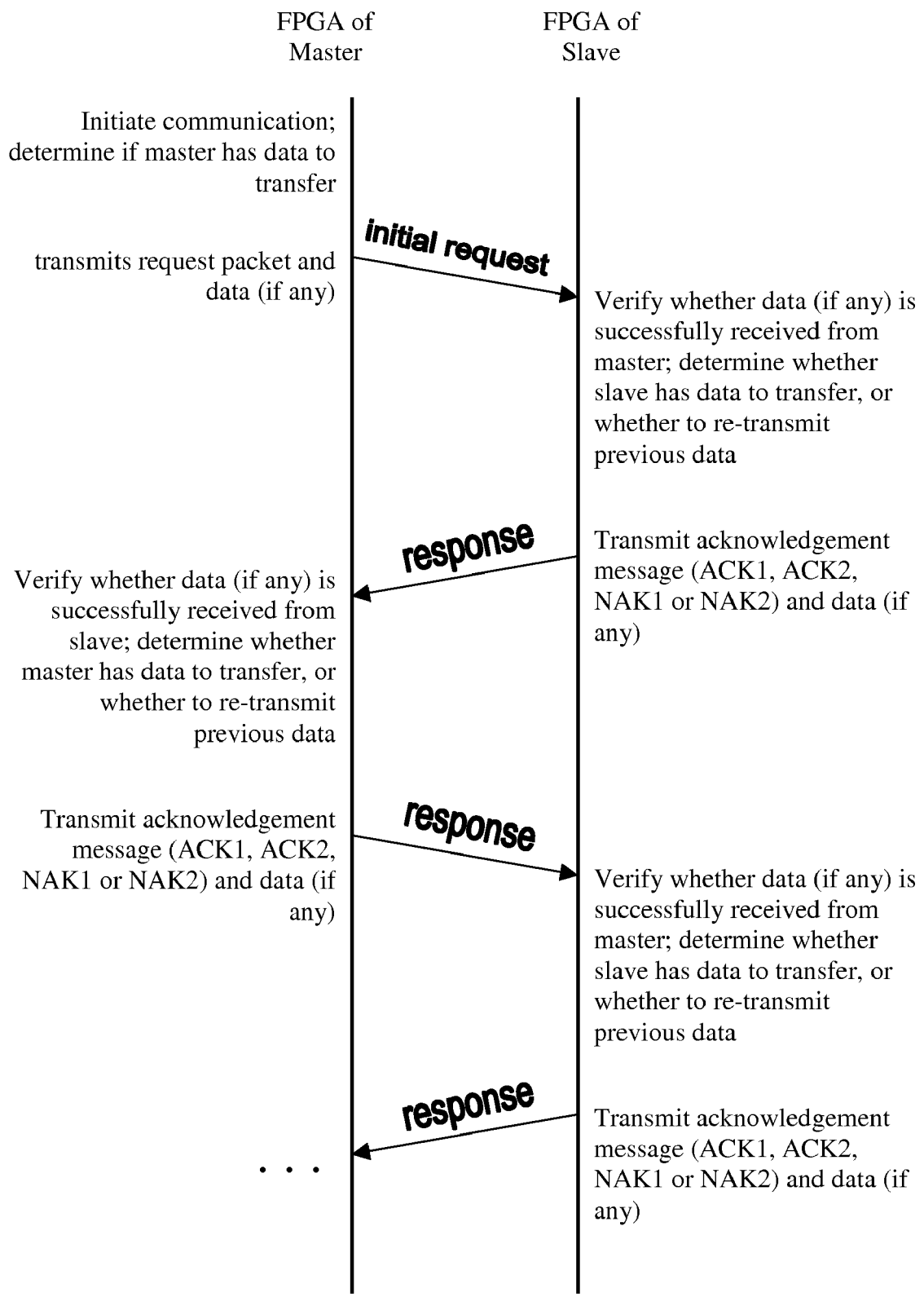
FIG. 2 illustrates a communication method between the master and the slave according to an embodiment of the present invention.

FIG. 2 illustrates a general communication flow between the FPGA 12 of the master 10 and the FPGA 22 of the slave 20. The master's FPGA 12 initiates the communication by transmitting a request and data (if any) in its buffer memory to the slave (initial request by the master). The slave's FPGA 22 responds by transmitting an acknowledgement and data (if any) in its buffer memory to the master (response by the slave). Before transmitting the acknowledgement, the slave verifies whether the data (if any) is successfully received from the master, and determines whether the slave has any data to transfer to the master. Depending on the results of the verification and determination, the acknowledgement transmitted by the slave is one of the following four types of acknowledgements: ACK1 (first acknowledgement), which indicates that the last transmission from the other side is successfully received and that data is being transmitted with the acknowledgement; ACK2 (second acknowledgement), which indicates that the last transmission from the other side is successfully received and that no data is being transmitted with the acknowledgement; NAK1 (first negative acknowledgement), which indicates that the last transmission from the other side is not successfully received and that data is being transmitted with the acknowledgement; and NAK2 (second negative acknowledgement), which indicates that the last transmission from the other side is not successfully received and that no data is being transmitted with the acknowledgement. The ACK1 and NAK1 acknowledgements are followed by data transmission from the slave, while the ACK2 and NAK2 acknowledgements are not.

After receiving the transmission from the slave, the master's FPGA 12 responds by transmitting an acknowledgement and data (if any) in its buffer memory to the slave (response by the master). Before transmitting the acknowledgement, the master verifies whether the data (if any) is successfully received from the slave, and determines whether the master has any data to transfer to the slave. If the acknowledgement from the slave is NAK1 or NAK2, the master will re-transmit the last data that is unsuccessfully transmitted to the slave, instead of new data. Depending on the above verification and determination, the acknowledgement transmitted by the master is one of the four types of acknowledgements defined earlier, namely, ACK1, ACK2, NAK1 and NAK2. The ACK1 and NAK1 acknowledgements are followed by data transmission from the master, while the ACK2 and NAK2 acknowledgements are not.

Thereafter, the master and the slave respond to each other back and forth in the manner described above, each response including an acknowledgement and data (if any). The acknowledgement is one of the four above-defined types of acknowledgements, namely, ACK1, ACK2, NAK1, and NAK2; the ACK1 and NAK1 acknowledgements are followed by data transmission. The content of the response depends on what acknowledgement is received from the other side, whether the transmission from the other side is successfully received, and whether the device has data in its buffer memory to transfer to the other side. If the acknowledgement received from the other side is an ACK1 or NAK1 acknowledgement (both indicating that data is being transmitted with the acknowledgement), the device verifies whether the data from the other side is successfully received. If the acknowledgement received from the other side is an ACK1 or ACK2 acknowledgement (both indicating that the device's last transmission is successfully received by the other side), the device determines whether it has any data in its buffer memory to transfer to the other side. If, on the other hand, the acknowledgement received from the other side is an NAK1 or NAK2 acknowledgement (both indicating that the device's last transmission is not successfully received be the other side), the device will re-transmit the last data, rather than transmitting new data in its buffer memory.

Figure 3A:
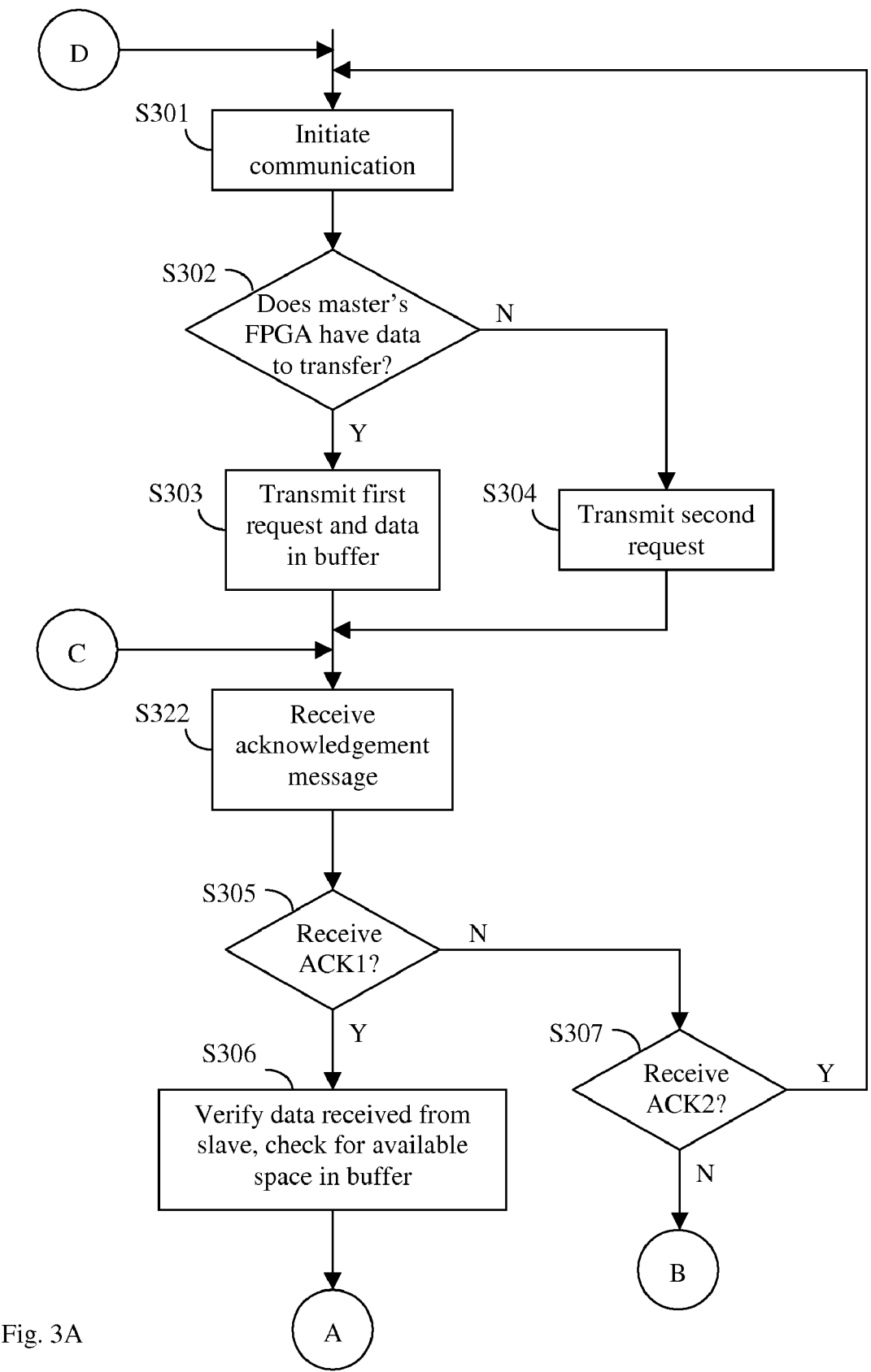
FIGS. 3A-3C illustrate a communication method performed by the master according to an embodiment of the present invention.
Figure 3B:
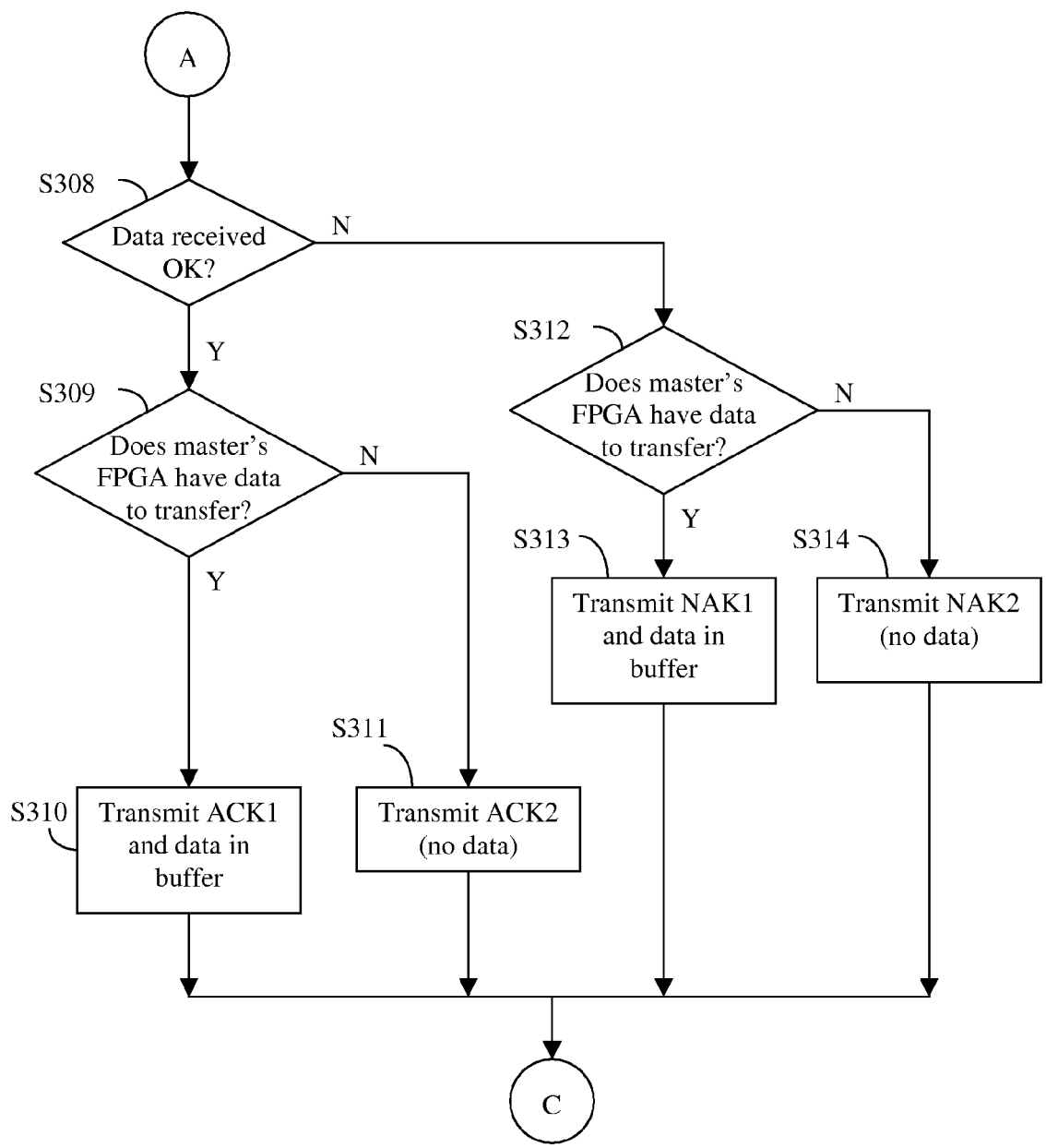
Figure 3C:
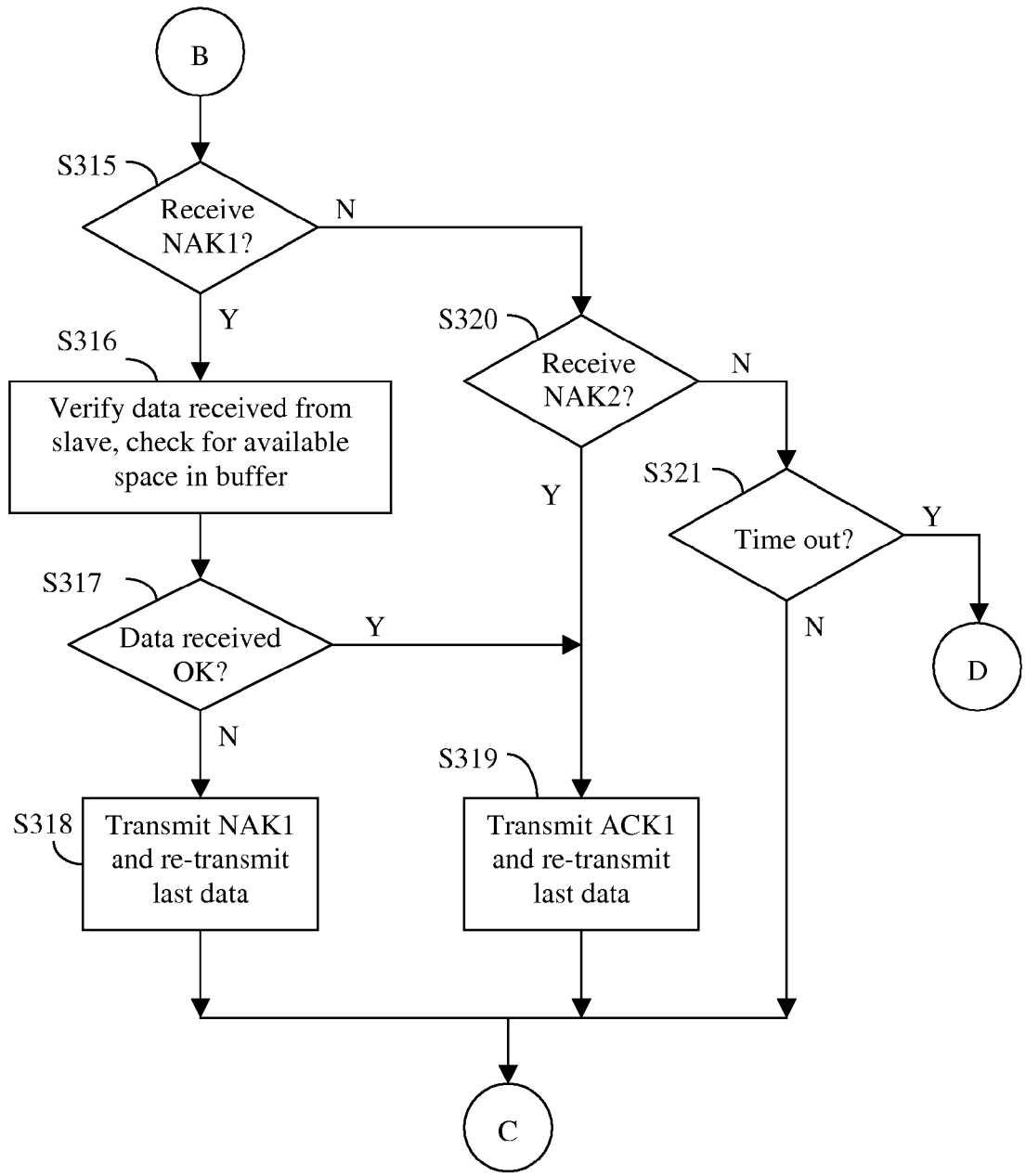
Figure 4A:
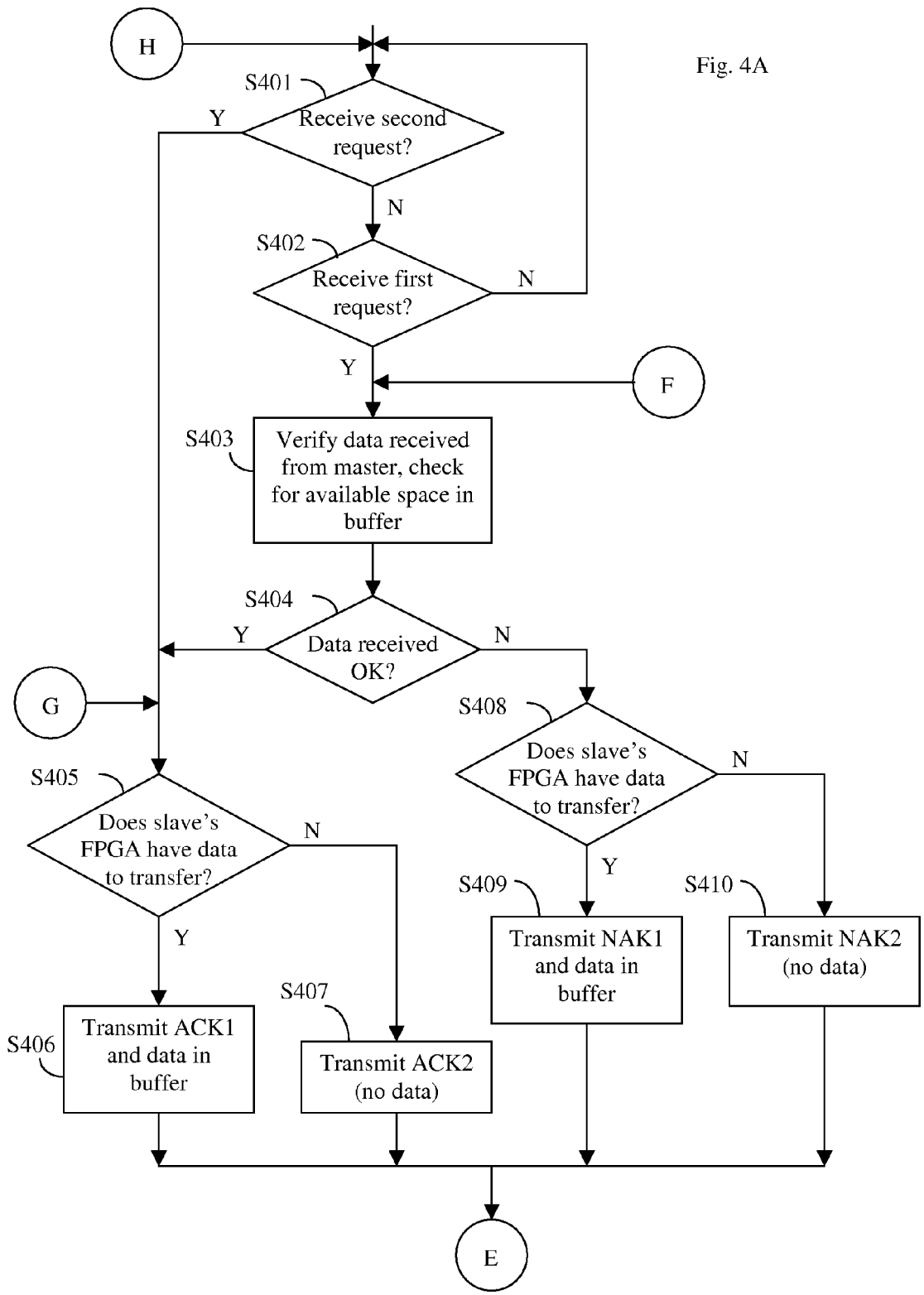
FIGS. 4A-4B illustrate a communication method performed by the slave according to an embodiment of the present invention.
Figure 4B:
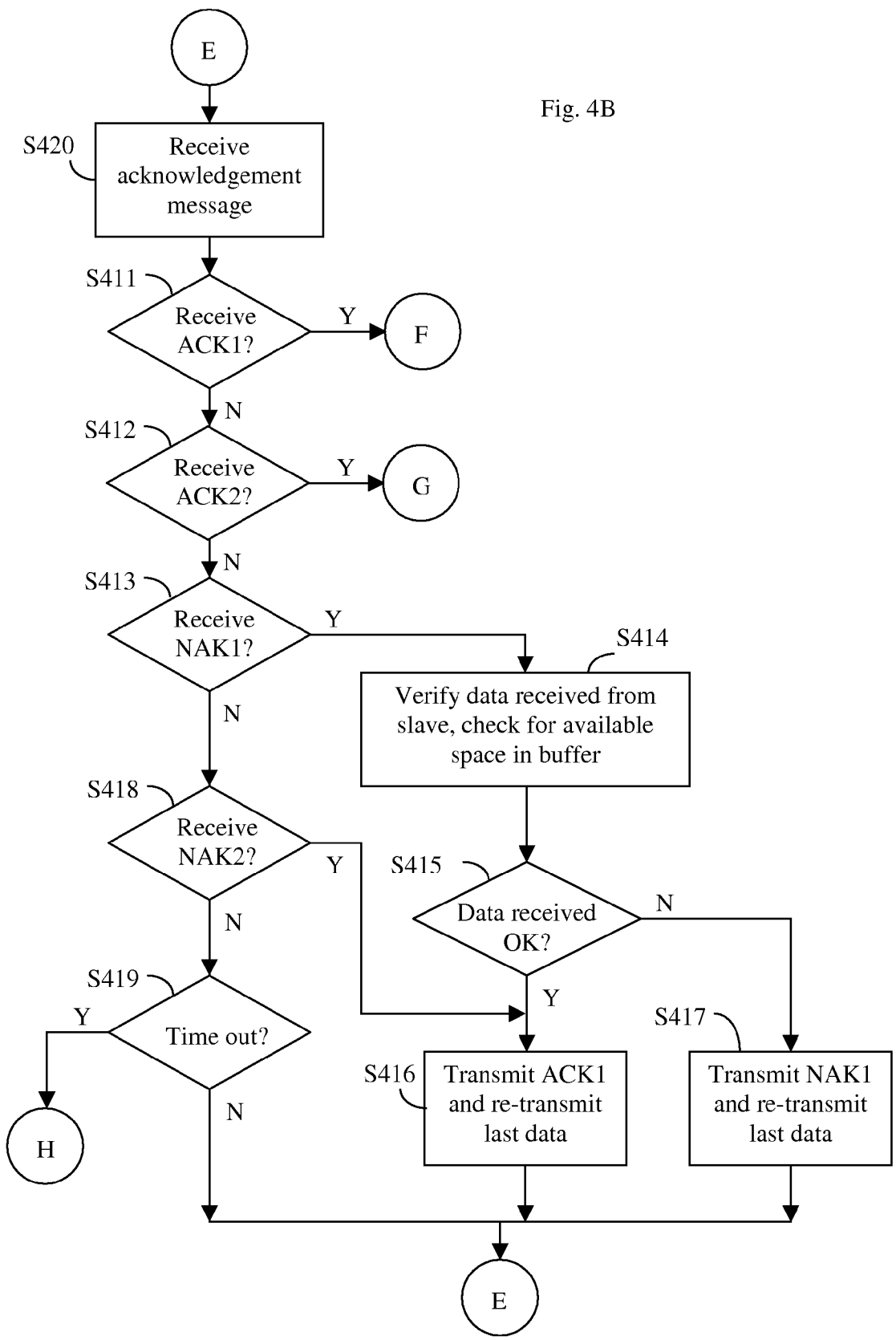

The communication process between the FPGAs 12 and 22 is illustrated in detail in FIGS. 3A-3C and 4A-4B. FIGS. 3A-3C illustrate the operations of the FPGA 12 of the master 10, and FIGS. 4A-4B illustrate the operations of the FPGA 22 of the master 20. For convenience, the descriptions below refer to "master" and "slave", which should be understood to refer to the FPGA 12 and the FPGA 22. Note also that FIGS. 3A-3C and 4A-4B illustrate the logic flow of the method implemented in the logic circuit 12 and 22; the logic flow can be implemented in any suitable manner.

The communication begins when the master initiates communication (step S301). At this time, if the master has data in its buffer memory to transfer to the slave ("Y" in step S302), the master transmits to the slave a first request indicating that data is being transmitted with the request, and transfers the data in its buffer memory (step S303). If the master has no data to transfer ("N" in step S302), it transmits to the slave a second request indicating that no data is being transmitted (step S304). After the transmission, the master waits for an acknowledgement from the slave (step S322). Steps S301 to S304 are the initial request of the master.

The slave's action upon receiving the master's initial request is shown in FIG. 4A. If the slave receives a second request ("Y" in step S401), the slave determines whether it has data in its buffer to transfer to the master (step S405). If it does ("Y" in step S405), the slave transmits to the master a first acknowledgement ACK1 indicating that the master's last transmission is successful and that data is being transmitted with the acknowledgement, and transmits to the master the data in its buffer memory (step S406). If the slave does not have data to transfer ("N" in step S405), it transmits a second acknowledgement ACK2 indicating that the master's last transmission is successful and that no data is being transmitted (step S407).

If the slave receives a first request instead of a second request ("N" in step S401 and "Y" in step S402), the slave verifies whether the data is successfully received from the master, including checking whether the buffer memory of the slave has sufficient space available to store the data (step S403). If the data is successfully received ("Y" in step S404), the slave determines if it has data in its buffer memory to transfer to the master (step S405). The slave then either transmits a first acknowledgement ACK1 with the data, or transmits a second acknowledgement ACK2, in the manner described earlier (steps S405, S406 and S407). If in step S404 the slave determines that the data from the master is not successfully received ("N" in step S404), the slave determines whether it has data in its buffer to transfer to the master (step S408). If it does ("Y" in step S408), the slave transmits to the master a first negative acknowledgement NAK1 indicating that the master's last transmission is unsuccessful and that data is being transmitted with the acknowledgement, and transmits the data in its buffer memory (step S409). If it does not have data to transfer ("N" in step S408), the slave transmits to the master a second negative acknowledgement NAK2 indicating that the master's last transmission is unsuccessful and that no data is being transmitted (step S410). After transmitting an appropriate acknowledgement and the data (if any) (steps S406, S407, S409 and S410), the slave waits for an acknowledgement from the master (step S420 of FIG. 4B).

The master's actions after receiving a transmission from the slave depend on what acknowledgement is received (FIGS. 3A-3C). In FIG. 3A, if the master receives a first acknowledgement ACK1 ("Y" in step S305), indicating that data is being transmitted with the acknowledgement, it verifies whether the data is successfully received from the slave, including verifying whether the buffer memory of the master has sufficient space available to store the data (step S306). In FIG. 3B, if the data is successfully received ("Y" in step S308), the master determines whether it has data in its buffer memory to transfer to the slave (step S309). If it does ("Y" in step S309), the master transmits to the slave a first acknowledgement ACK1 indicating that the slave's last transmission is successfully received and that data is being transmitted with the acknowledgement, and transmits to the slave the data in its buffer memory (step S310); if not, the master transmits to the slave a second acknowledgement ACK2 indicating that the slave's last transmission is successfully received and that no data is being transmitted (step S311). If in step S308 the master determines that the data is not successfully received from the slave ("N" in step S308), the master determines whether it has data in its buffer to transfer to the slave (step S312). If it does ("Y" in step S312), the master transmits to the slave a first negative acknowledgement NAK1 indicating that the slave's last transmission is not successfully received and that data is being transmitted with the acknowledgement, and transmits to the slave the data in its buffer memory (step S313). If it does not have data to transfer ("N" in step S312), the master transmits to the slave a second negative acknowledgement NAK2 indicating that the slave's last transmission is not successfully received and that no data is being transmitted (step S314). After transmitting an appropriate acknowledgement and the data (if any) (steps S310, S311, S313 and S314), the master waits for an acknowledgement from the slave (step S322 of FIG. 3A).

In FIG. 3A, if the master does not receive a first acknowledgement ACK1 ("N" in step S305) but receives a second acknowledgement ACK2 from the slave ("Y" in step S307), the master repeats step S301 to re-initiate communication. If the master does not receive a first or second acknowledgement ("N" in step S307) but receives a first negative acknowledgement NAK1 ("Y" in step S315 of FIG. 3C), indicating that data is being transmitted with the acknowledgement, it verifies whether the data is successfully received from the slave (step S316). If the data is successfully received ("Y" in step S317), the master transmits to the slave a first acknowledgement ACK1 indicating that the slave's last transmission is successful and that data is being transmitted with the acknowledgement, and re-transmits to the slave the last data previously transmitted by the master (step S319). If the data from the slave is not successfully received ("N" in step S317), the master transmits to the slave a first negative acknowledgement NAK1, and re-transmits to the slave the last data previously transmitted by the master (step S318).

If the master does not receive a first or second acknowledgement or a first negative acknowledgement ("N" in step S315) but receives a second negative acknowledgement NAK2 ("Y" in step S320), it transmits to the slave a first acknowledgement ACK1, and re-transmits to the slave the last data previously transmitted by the master (step S319). If the master does not receive any of the four types of acknowledgements within a predefined time period ("N" in step S320 and "Y" in step S321), the master times out and returns to the state before the initial request. After the master appropriately handles the transmission from the slave and transmits an appropriate response (steps S310, S311, S313, S314, S318, or S319), or if the master has not received any acknowledgement from the slave but has not timed out yet ("N" in step S321), the master waits for an acknowledgement from the slave (step S322).

The slave's actions after receiving a transmission from the master depend on what acknowledgement is received (FIGS. 4A-4B). In FIG. 4B, if the slave receives a first acknowledgement ACK1 ("Y" in step S411), indicating that data is being transmitted with the acknowledgement, the slave verifies whether the data is successfully received from the master (step S403 and step S404), determines whether the slave has any data to transfer to the master (step S405 and S408), and make an appropriate transmission based on these determinations in the manner described earlier (steps S406, S407, S409 or S410). If the slave does not receive the first acknowledgement ACK1 ("N" in step S411) but receives the second acknowledgement ACK2 ("Y" in step S412), the slave determines whether it has any data to transfer to the master (step S405), and makes an appropriate transmission based on this determination in the manner described earlier (steps S406 or S407).

If the slave does not receive a first or second acknowledgement ("N" in step S412) but receives a first negative acknowledgement NAK1 ("Y" in step S413), indicating that data is being transmitted with the acknowledgement, the slave verifies whether the data is successfully received from the master (step S414). If the data is successfully received ("Y" in step S415), the slave transmits to the master a first acknowledgement ACK1, and re-transmits to the master the last data previously transmitted by the slave (step S416). If the data from the master is not successfully received ("N" in step S415), the slave transmits to the master a first negative acknowledgement NAK1, and re-transmits to the master the last data previously transmitted by the slave (step S417).

If the slave does not receive a first or second acknowledgement or a first negative acknowledgement ("N" in step S413) but receives a second negative acknowledgement NAK2 ("Y" in step S418), the slave transmits to the master a first acknowledgement ACK1, and re-transmits to the master the last data previously transmitted by the slave (step S416). If the slave does not receive any of the four types of acknowledgements within a predefined time period ("N" in step S418 and "Y" in step S419), the slave times out and returns to the state before the initial request is received (before step S401). After the slave appropriately handles the transmission from the master and transmits an appropriate response (steps S406, S407, S409, S410, S416, or S417), or if the slave has not received any acknowledgement from the master but has not timed out yet ("N" in step S419), the slave waits for an acknowledgement from the master (step S420).

From the above descriptions, it can be seen that the FPGA 12 of the master 10 and the FPGA 22 of the slave 20 can automatically communicate with each other and maintain the communication without the intervention of the CPUs 11 and 21. The CPU 11 of the master 10 and the CPU 21 of the slave 20 transfer any data to be transferred to the other side into the buffer memories of the FPGAs 12 and 22, respectively, but do not need to take any actions to effectuate the actual data transfer between the master 10 and the slave 20. Thus, even though the actual communication between the FPGAs 12 and 22 is half duplex, from the standpoint of the CPUs 11 and 21, the communication appears to be full-duplex, meaning that the CPU 11 of the master 10 does not need to initiate communication, and the CPU 21 of the slave 20 does not need to wait for the CPU 11 of the master 10 to initiate communication.

The pseudo-full duplex communication method and apparatus described above has the advantage that the CPU and the higher-level APIs of the master do not need to be concerned with sending requests to initiate communication. The method achieves increased communication speed (the slave can transfer its data to the master in a timely manner) while reducing the burden on the CPUs of the master and the slave. The method is especially advantageous in communications where relatively large amounts of data are to be transferred. An example of such communications is a KVM switch system (see FIG. 5) that implements remote USB access, where the KVM switch 110 (master) can remotely access mass storage devices such as USB devices on the computer 120 (slave), which may require large amounts of data to be transferred over the Cat5 link between the KVM switch and the computer.

The method described above can also be used when one master communicates with multiple slaves. FIG. 1 illustrates the connection between the master 10 (e.g. the KVM switch 110 in FIG. 5) and one slave 20 (e.g. one computer 120). The master's FPGA 12 can be connected to multiple slaves via one or more UARTs 13 and a switch. The communication method shown in FIGS. 2, 3A-3C and 4A-4B is performed with respect to each slave. To communicate with multiple slaves, the method performed by the master can be suitably modified, for example, by adding a step before step S301 in FIG. 3A so that the master initiates communication with each slave in turn.

Although the invention is described for RS485 communications, it can be used in other communication method such as RS422, RS423, etc.

It will be apparent to those skilled in the art that various modification and variations can be made in the communication method and apparatus of the present invention without departing from the spirit or scope of the invention. Thus, it is intended that the present invention cover modifications and variations that come within the scope of the appended claims and their equivalents.

What is claimed is:

1. A system comprising:

a master, the master including a first processor, a first logic circuit connected to the first processor, a first buffer memory accessible by the first processor and the first logic circuit, and a first transceiver device connected to the first logic circuit, wherein the first transceiver device is adapted for connecting to a communication link, wherein the first processor is operable to store into the first buffer memory first data to be transferred over the communication link, and to retrieve from the first buffer memory second data received over the communication link, wherein the first logic circuit is operable, without intervention of the first processor, to transmit the first data in the first buffer memory over the communication link using the first transceiver device, and to receive the second data over the communication link using the first transceiver device and store it in the first buffer memory, wherein the first logic circuit is operable to transmit initial requests over the communication link, to receive acknowledgements over the communication link, and to transmit either acknowledgements alone or acknowledgements with at least a portion of the first data from the first buffer memory over the communication link in response to the received acknowledgements, wherein the initial requests transmitted by the first logic circuit includes a first request indicating that data is being transmitted with the request and a second request indicating that no data is being transmitted with the request, wherein the first logic circuit determines whether the first buffer memory contains the first data to be transferred over the communication link, and transmits either the first request with at least a portion of the first data or the second request based on the determination, wherein the acknowledgements transmitted by the first logic circuit includes a first acknowledgement which indicates that the first logic circuit successfully received a last transmission over the communication link and that data is being transmitted with the acknowledgement, a second acknowledgement which indicates that the first logic circuit successfully received a last transmission over the communication link and that no data is being transmitted with the acknowledgement, a first negative acknowledgement which indicates that the first logic circuit failed to successfully receive a last transmission over the communication link and that data is being transmitted with the acknowledgement, and a second negative acknowledgement which indicates that the first logic circuit failed to successfully receive a last transmission over the communication link and that no data is being transmitted with the acknowledgement, wherein the first logic circuit determines whether it successfully received a last transmission over the communication link and determines whether the first buffer memory contains the first data to be transferred over the communication link, and transmits one of the first acknowledgement, the second acknowledgement, the first negative acknowledgement and the second negative acknowledgement based on the determinations, and wherein the first logic circuit transmits at least a portion of the first data in the first buffer memory following the first acknowledgement and the first negative acknowledgement.

2. The system of claim 1, wherein the first processor transfers data to and from the first buffer memory using direct memory access.

3. The system of claim 1, wherein the first logic circuit is a field-programmable gate array (FPGA).

4. The system of claim 1, wherein the first transceiver device is a universal asynchronous receiver/transmitter (UART).

5. The system of claim 1, wherein the first transceiver device is an RS485 transceiver.

6. The system of claim 1, wherein the master is a keyboard video mouse switch.

7. The system of claim 1, further comprising:

a slave, the slave including a second processor, a second logic circuit connected to the second processor, a second buffer memory accessible by the second processor and the second logic circuit, and a second transceiver device connected to the second logic circuit, wherein the second transceiver device is connected to the communication link, wherein the second processor is operable to store into the second buffer memory the second data to be transferred over the communication link, and to retrieve from the second buffer memory the first data received over the communication link, and wherein the second logic circuit is operable, without intervention of the second processor, to transmit the second data in the second buffer memory over the communication link using the second transceiver device, and to receive the first data over the communication link using the second transceiver device and store it in the second buffer memory.

8. The system of claim 7, wherein the second logic circuit is operable to receive initial requests and acknowledgements from the first logic circuit over the communication link, and to transmit either acknowledgements alone or acknowledgements with a portion of the second data from the second buffer memory to the first logic circuit over the communication link in response to the initial requests or the acknowledgements received from the first logic circuit.

9. The system of claim 7, wherein the second processor transfers data to and from the second buffer memory using direct memory access.

10. The system of claim 7, wherein the second logic circuit is a field-programmable gate array (FPGA).

11. The system of claim 7, wherein the second transceiver device is a universal asynchronous receiver/transmitter (UART).

12. A system comprising:
   a master, the master including a first processor, a first logic circuit connected to the first processor, a first buffer memory accessible by the first processor and the first logic circuit, and a first transceiver device connected to the first logic circuit,
   wherein the first transceiver device is adapted for connecting to a communication link, wherein the first processor is operable to store into the first buffer memory first data to be transferred over the communication link, and to retrieve from the first buffer memory second data received over the communication link,
   wherein the first logic circuit is operable, without intervention of the first processor, to transmit the first data in the first buffer memory over the communication link using the first transceiver device, and to receive the second data over the communication link using the first transceiver device and store it in the first buffer memory, and
   a slave, the slave including a second processor, a second logic circuit connected to the second processor, a second buffer memory accessible by the second processor and the second logic circuit, and a second transceiver device connected to the second logic circuit,
   wherein the second transceiver device is connected to the communication link,
   wherein the second processor is operable to store into the second buffer memory the second data to be transferred over the communication link, and to retrieve from the second buffer memory the first data received over the communication link, and
   wherein the second logic circuit is operable, without intervention of the second processor, to transmit the second data in the second buffer memory over the communication link using the second transceiver device, and to receive the first data over the communication link using the second transceiver device and store it in the second buffer memory,
   wherein the second logic circuit is operable to receive initial requests and acknowledgements from the first logic circuit over the communication link, and to transmit either acknowledgements alone or acknowledgements with a portion of the second data from the second buffer memory to the first logic circuit over the communication link in response to the initial requests or the acknowledgements received from the first logic circuit,
   wherein the acknowledgements transmitted by the second logic circuit includes a first acknowledgement which indicates that the second logic circuit successfully received a last transmission over the communication link and that data is being transmitted with the acknowledgement, a second acknowledgement which indicates that the second logic circuit successfully received a last transmission over the communication link and that no data is being transmitted with the acknowledgement, a first negative acknowledgement which indicates that the second logic circuit failed to successfully receive a last transmission over the communication link and that data is being transmitted with the acknowledgement, and a second negative acknowledgement which indicates that the second logic circuit failed to successfully receive a last transmission over the communication link and that no data is being transmitted with the acknowledgement,
   wherein the second logic circuit determines whether it successfully received a last transmission over the communication link and determines whether the second buffer memory contains the second data to be transferred over the communication link, and transmits one of the first acknowledgement, the second acknowledgement, the first negative acknowledgement and the second negative acknowledgement based on the determinations, and
   wherein the second logic circuit transmits at least a portion of the second data in the second buffer memory following the first acknowledgement and the first negative acknowledgement.

13. A method of communication performed by a system which includes a master, the master including a first processor, a first logic circuit connected to the first processor, a first buffer memory accessible by the first processor and the first logic circuit, and a transceiver device connected to the first logic circuit, the transceiver device being adapted for connecting to a communication link, the method comprising:
   (a) the first processor storing into the first buffer memory first data to be transferred over the communication link;
   (b) the first logic circuit, without intervention of the first processor, transmitting the first data in the first buffer memory over the communication link using the transceiver device and receiving second data over the communication link using the transceiver device and storing it in the first buffer memory;
   wherein step (b) includes:
      the first logic circuit transmitting initial requests or initial requests with data from the first buffer memory over the communication link;
      the first logic circuit receiving acknowledgements over the communication link; and
      the first logic circuit transmitting either acknowledgements alone or acknowledgements with at least a portion of the first data from the first buffer memory over the communication link in response to the received acknowledgements; and
   (c) the first processor retrieving the second data from the first buffer memory,
   wherein the initial requests transmitted by the first logic circuit includes a first request indicating that data is being transmitted with the request and a second request indicating that no data is being transmitted with the request,
   wherein the first logic circuit determines whether the first buffer memory contains the first data to be transferred over the communication link, and transmits either the first request with at least a portion of the first the data or the second request based on the determination,
   wherein the acknowledgements transmitted by the first logic circuit includes a first acknowledgement which indicates that the first logic circuit successfully received a last transmission over the communication link and that data is being transmitted with the acknowledgement, a second acknowledgement which indicates that the first logic circuit successfully received a last transmission over the communication link and that no data is being transmitted with the acknowledgement, a first negative acknowledgement which indicates that the first logic circuit failed to successfully receive a last transmission over the communication link and that data is being transmitted with the acknowledgement, and a second negative acknowledgement which indicates that the first logic circuit failed to successfully receive a last transmission over the communication link and that no data is being transmitted with the acknowledgement, wherein the first logic circuit determines whether it successfully received a last transmission over the communication link and determines whether the first buffer memory contains the first data to be transferred over the communication link, and transmits one of the first acknowledgement, the second acknowledgement, the first negative acknowledgement and the second negative acknowledgement based on the determinations, and wherein the first logic circuit transmits at least a portion of the first data in the buffer memory following the first acknowledgement and the first negative acknowledgement.

14. The method of claim 13, wherein the transceiver device is an RS485 transceiver.

15. The method of claim 13, wherein the system further includes a slave, the slave including a second processor, a second logic circuit connected to the second processor, and a second buffer memory accessible by the second processor and the second logic circuit, the master and the slave being connected by the communication link, the method further comprising:

(d) the second processor storing the second data in the second buffer memory;

(e) the second logic circuit, without intervention of the second processor, transmitting the second data form the second buffer memory of the slave to the first buffer memory of the master over the communication link;

(e) the second processor retrieving the first data from the second buffer memory.

16. The method of claim 15, wherein step (c) includes:

the first logic circuit transmitting initial requests or initial requests with at least a portion of the first data from the first buffer memory to the second logic circuit;

the second logic circuit transmitting acknowledgements or acknowledgements with at least a portion of the second data from the second buffer memory to the first logic circuit in response to the initial requests;

the first logic circuit transmitting acknowledgements or acknowledgements with at least a portion of the first data from the first buffer memory to the second logic circuit in response to the acknowledgements received from the second logic circuit; and the second logic circuit transmitting acknowledgements or acknowledgements with at least a portion of the second data from the second buffer memory to the first logic circuit in response to the acknowledgements received from the first logic circuit.

* * * * *